United States Patent Office 2,961,201
Patented Nov. 22, 1960

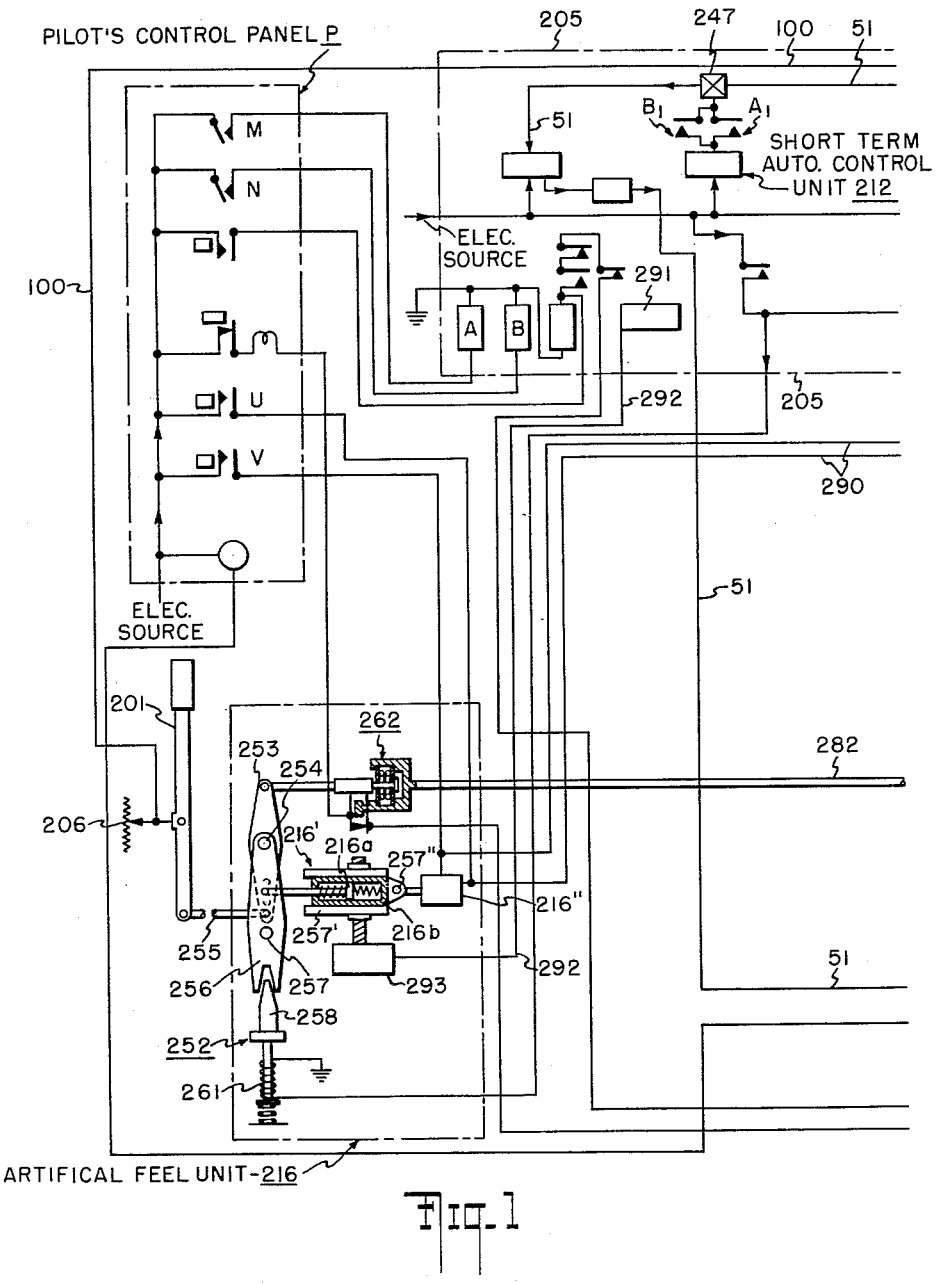

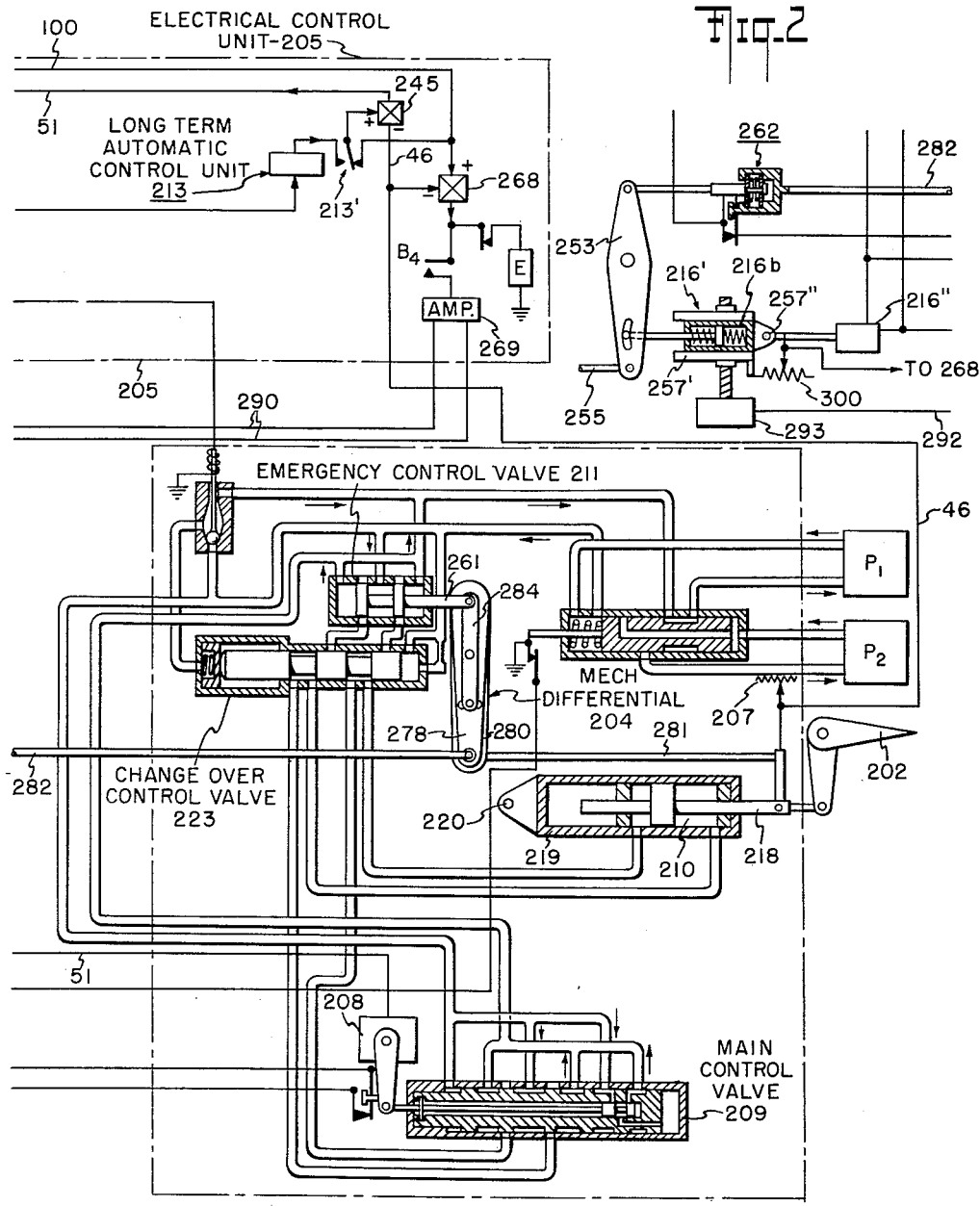

2,961,201

AUTOMATIC CONTROL SYSTEM FOR AIRCRAFT

Hugh Brougham Sedgfield, Hampton, Marcus Lionel Jofeh, Cranford, Ruben Hadekel, London, and William Richard Bohnel, Windsor, England, assignors to The Sperry Gyroscope Company Limited, Brentford, England, a British company Filed Aug. 1, 1955, Ser. No. 525,682

Claims priority, application Great Britain Aug. 25, 1954

8 Claims. (Cl. 244—77)

This invention relates to a control system for controlling a control surface of an aircraft deflection of which produces angular movement of the aircraft about a principal axis of the aircraft and having two modes of operation capable of being rendered effective at will, one mode of operation being the normal manual-control mode for that control surface in which the control surface is controlled in part at least by the primary manual controller provided in the aircraft for controlling that control surface and the other mode of operation being an automatic mode.

More particularly the invention relates to such an aircraft control system in which the manual-control channel of the system is a powered manual control channel of the kind in which a manual controller, on being displaced, effects actuation of a control surface of the aircraft through a servo motor to an angle substantially corresponding to the displacement of the manual controller, in which there is no provision inherent in the control arrangement for the servo motor for ensuring proportional "feel" on the manual controller by reaction of the load force acting on the control surface back on the manual controller, and in which an "artificial feel" device is provided to apply forces to the manual controller to simulate those that would be applied by the control surface if this were operated directly from the manual controller. The "artificial feel" device comprises a centralising device, such as a centralising spring arrangement or its equivalent, and it exerts a centralising force on the manual controller substantially proportional to the displacement of the manual controller from a null position.

In a known powered manual control system the centralising device comprises a spring arrangement and provision is made for enabling an adjustment to be made to the null position to which the centralising device tends to centralise the manual controller, the adjustment being made by adjusting the position of the spring anchorage or the spring arrangement in toto. In the normal or null position of the control system the anchorage of the centralising spring is in the position where no centralising force is exerted on the manual controller if the latter is in the position corresponding to the normal or null position of the control surface. When the system is adjusted in this manner the pilot, when he operates the manual controller from its null position, feels the centralising force exerted by the centralising device on the manual controller; this centralising force corresponds in magnitude and sense to the deflection imparted to the control surface from its null position. Consequently the human pilot experiences "artificial feel" simulating the torque that he would feel if he had adjusted the control surface directly by the manual controller and were experiencing the back thrust from the control surface.

If the aircraft is out of trim the control surface will in general have to be held deflected by the appropriate amount to compensate for the out of trim condition, or will have to be given the appropriate amount of deflection as an average, or long-term value, in addition to whatever short-term fluctuating deflections are required to produce required or demanded short-term displacements of the control surfaces. The pilot will have to maintain this mean deflection of the surface by maintaining a mean deflection of his manual controller and he will feel that the centralising spring arrangement is exerting on the manual controller centralising forces having, as their mean value, a steady component force in one direction. This indicates to the human pilot that the aircraft is out of trim.

The object of providing the settable adjustment of the "artificial feel" device is to enable the pilot to set the null of the device to correspond to the mean deflection of the control surface required to compensate for the out of trim condition of the aircraft. To do this the pilot adjusts the "artificial feel" device when he is controlling the aircraft under manual control by displacing the anchorage of the centralising spring, or by displacing the spring arrangement in toto, until he experiences no long-term component of centralising force exerted on the manual controller by the centralising spring. The system is then said to be trimmed and the human pilot feels only the fluctuating components of the centralising force exerted by the "artificial feel" device corresponding to the displacement of the control surface about its trim position.

The adjustment of the "artificial feel" device to its trim position is effected by a trim motor connected to displace the anchorage of the spring arrangement, or to displace the spring arrangement in toto, and the motor is controlled to operate in one direction or the other by a switch or switches under the control of the human pilot.

The manual control channel forming part of a control system according to the present invention is provided with an "artificial feel" device having provision for enabling an adjustment to be made to the null position of the "artificial feel" device to compensate for out-of-trim conditions of the aircraft. It may be that, when the aircraft is under automatic control, the elevator will have been adjusted to compensate for an out-of-trim condition of the aircraft and it is desirable, therefore, to ensure that, if the system is changed over suddenly from automatic control to manual control, the "artificial feel" device is correctly trimmed to suit the position of the manual controller at the beginning of the subsequent manual control mode of operation.

According to the invention, therefore, there is provided a control system for controlling a control surface of an aircraft, the deflection of which produces angular movement of the aircraft about a principal axis of the aircraft, having alternative modes of operation capable of being rendered effective at will, one mode of operation being the normal manual-control mode for the control surface, in which the control surface is controlled, at least in part, by the primary manual controller provided in the aircraft. The other mode is an automatic mode of operation with motive means having an output member operatively connected to the control surface; control means arranged for energising the motive means so that the output member may effect displacement of the control surface, the control means being capable of operation in alternative modes, in one of which, the energisation of the motive means is varied in dependence on displacement of the primary manual controller, and in the other of which, the energisation of the motive means is normally controlled solely by a monitor providing data concerning the aircraft's angular position, or angular motion, about the said principal axis; means for selecting and rendering effective one or more of these modes of operation of the control means; and an artificial-feel device having two relatively movable members, the first of which is operatively connected to the manual controller, and the second of which is adjustably mounted on a support mounted on the aircraft's structure together with centralising means arranged to apply a force between the two members substantially proportional to their separation, so that, in operation, the manual controller is acted on by a centralising force acting towards a null position with respect to the aircraft's structure that variably depends on the adjustment effected to the second member with respect to its support, this centralising force being substantially proportional to the displacement of the manual controller from the null position. The invention is characterized by automatic adjusting means capable of being rendered operative to adjust the position of the second member slowly and continuously with respect to its support towards a position on the support corresponding to the position of the control surface relative to the aircraft, whereby the second member tends to assume a position corresponding to the mean deflection of the control surface from its central position. Means are also provided for rendering the noted adjusting means operative during the automatic mode of operation of the control means.

With the control system referred to in the preceding paragraph it is ensured that if an instrument is controlling the aircraft about say, a pitch axis, to fly horizontally or at a certain climb angle of pitch, the "artificial feel" is automatically adjusted during the automatic control of the aircraft so that if a changeover to manual control of the aricraft takes place no centralising force is exerted on the manual controller during the subsequent manual control of the aircraft as the manual controller is already in the position required to make the aircraft continue in its previous mode of flight that is, level or at the previously maintained level of climbing.

Embodiments of the invention will now be described by way of example only with reference to the accompanying drawings in which:

Figures 1 and 1a are a two part diagrammatic illustration of a combined or integrated manual and automatic control system for controlling the motion of an aircraft about one of its axes.

Figure 2 illustrates a modification of Figure 1.

Referring to Figures 1 and 1a there is illustrated a control system for an aircraft for enabling the aircraft to be controlled about its pitch axis either manually with servo aid or automatically. It will be appreciated that the control system illustrated is representative of a control system that may be employed for exercising control of the aircraft about any one of its three axes.

The apparatus comprises a pilot's manual controller or control column 201 for controlling an elevator 202 to produce changes in pitch of the aircraft, an electro-hydraulic motive means and control means therefor, and an electrical control unit 205 which includes a short term automatic control unit 212 and a long-term automatic control unit 213. Control unit 212 may consist of a rate gyro and pick-off arranged in the craft to provide a short term signal output in accordance with rate of turn of the craft about its pitch or athwartship axis. Unit 213 may consist of a gyro vertical with a pitch pick-off having a long term displacement output signal when the craft departs from level flight to a dive or climb attitude. The apparatus also includes an artificial-feel unit 216 and a pilot's control panel P. Before describing details of these various components it may be stated that the apparatus is capable of operation in different modes. The elevator 202 may be controlled from the control column 201 through two separate channels, a normal channel and an emergency channel and the elevator 202 may also be controlled automatically from a monitoring instrument or instruments forming part of the electrical control unit 205.

The apparatus provides for power actuation of the elevator 202 from the control column 201 and for this purpose differential electrical means are provided comprising a signal-generating potentiometer 206 actuated by the control column 201 and a signal-generating potentiometer 207, actuated by a hydraulic servo-motor 210 that moves the elevator 202. The output of the potentiometers 206 and 207 is applied through leads 100, 46, to an electrical differential 245 whose output is fed by way of lead 51 to an electrical transducer 208 which controls the operation of a main control valve 209, which in turn controls the supply of pressure fluid to operate the hydraulic servo motor 210 from a source of supply $P_1$ or an alternative source $P_2$. This comprises the main control channel for actuation of the elevator 202 by the control column 201.

Another control channel, by which the elevator 202 may be controlled by the control column 201, for example, during an emergency when faults have occurred in the system which render control through the main control channel impossible or dangerous, comprises an emergency control valve 211 which controls the supply of pressure fluid from the sources $P_1$ or $P_2$ to actuate the servo motor 210 under the control of a mechanical differential device 204, the mechanical differential device consisting of two input members or links 278 and 280, capable of differential movement, one under the control of the control column 201, and the other under the control of an output member 218 of servo-motor 210, and an output member 284 connected to actuate the slide rod 261 of the control valve 211. The hydraulic servo motor 210 is a conventional motor of the type with a cylinder 219 pivotally connected about the axis 220 to the structure of the craft. The piston or output member 218 of the motor is positioned in dependence on whether pressure fluid is applied to the right-hand side or left-hand side of the piston, this being determined by the position of the main control valve 209 or the emergency control valve 211. A transfer means or changeover control valve 223 selectively renders either valve 209 or valve 211 effective. In the position of the parts shown in Figure 1a, the valve 223 is conditioned for normal operation in which the servo motor 210 is controlled by the main control valve 209.

During normal manual control of the elevator 202, that is, when the servo-motor 210 is being controlled through the transducer 208 and the main control valve 209, the short-term automatic control unit 212 may also be rendered effective by closure of switch $B_1$ to provide a control signal which is added to the demand control signal carried by lead 51 provided by the potentiometer 206 on movement of the control column 201 and to the repeat-back signal provided by the potentiometer 207 on movement of the output member 218 of the servo motor 210. The short-term stabilisinz unit 212 is responsive to short-term or transient disturbances or oscillations of low amplitude of the aircraft, such as rapid oscillations and serves to control the elevator 202 so as to nullify the short-term disturbances or oscillations of the aircraft automatically, and the control is such that actuation of the elevator 202 due to the signal from the short-term unit 212 does not effect movement of the control column 201 through the linkages 281, 282, by which the elevator is mechanically connected to the control column 201, unless the signal from the short term stabilising unit 212 exceeds a predetermined magnitude.

When the apparatus is functioning as an automatic control system for controlling the aircraft's attitude about its pitch axis, a signal from the long term control unit 213 is combined with the signal from the potentiometer 207 and the signal from short-term stabilising unit 212, the resultant signal being applied to the transducer 208 which controls operation of the main control valve 209 to control the supply of pressure fluid to actuate the hydraulic servo motor 210. The elevator 202 is thus automatically controlled by the outputs of the short-term and long-term units 212 and 213. In this mode of operation, the blade of switch 213' is located against the left-hand contact, as viewed in Figure 1a, to include the output of the control unit 213 in the output lead 51 through differential 245. The signal from the stick potentiometer 206 is not utilized in this mode as the lead 100 carrying the same to the differential 245 is then broken at the switch 213'.

The system as briefly described above thus provides means for automatic control or manual control of the aircraft about its pitch axis with the employment of a common servo system for actuating the elevator. When operated in the manual boost mode, the short term automatic control unit 212 may be included to provide for control of the elevator 202 to nullify short term oscillations of the craft in pitch. For this purpose the switch M is provided in the panel P. When closed the switch M energizes relay A, which results in the closing of contacts $A_1$ to connect the output of the unit 212 to the electrical differential 247 in the input lead 51 to the transducer 208. To ensure that the movement of the elevator 202 under these conditions is not reflected in the control column 201, the improved system further includes a lost motion device generally indicated at 252. As shown in Figure 1, the lost motion device includes lever 253 pivoted on lever 256 about axis 254. The upper end of lever 253 is connected to rod 282 through a flexible connection 262. The lower end of the lever 253 is connected to the column 201 by link 255. The lever 256 of the combination is pivoted on the aircraft frame about an axis 257. The extent of the lost motion provided depends on the angular movement permitted to the lever 256 about axis 257 by a stop member 258 which cooperates with the notched end of the lever. In practice, the lost motion provided is the equivalent of the travel of the emergency control valve 211 plus the maximum expected output from the short term control unit 212 in adition to the maximum output of differential 245. The device 252 relieves the human pilot of the mechanical load in the system when operating in this mode due to linkage to the link 278. The solenoid 261 disables the lost motion device 252 when the system is functioning in the automatic pilot mode.

The artificial feel unit 216 of the system includes an "artificial feel" device 216' which is used to apply forces to the control column 201 similar to those that would be applied by the elevator 202 if this were operated directly from the control column 201. The device 216' comprises three members or parts, one 216a, in the form of a piston connected to the control column 201 by means of a mechanical linkage 253, 256, 255, and the other, 216b, in the form of a cylinder for the piston mounted in a support 257' and longitudinally adjustable in the support. The device 216 also comprises a centralising device between the two members which may be a centralising spring, or an arrangement of springs, or an equivalent, and which exercises a centralising force between the two members which is proportional to the displacement between them. The centralising device therefore exerts a centralising force on the control column 201 proportional to the displacement of the control column 201 from a null position determined by the position of member 216b in its support. As shown the centralising device comprises two springs in the cylinder 216b on either side of the piston and connected at their outer ends to the ends of cylinder 216b and at their inner ends to the piston 216a. The null position to which the centralising spring device tends to centralise the control column 201 is made adjustable by a trim motor 216", the adjustment being made by energising the trim motor 216" which functions to move the anchorage of the centralising springs, that is, the cylinder 216b, slowly in one direction or the other. In the normal or null position of the control system the anchorage of the centralising spring device is in the position where the latter exerts no centralising force on the control column 201 if the control column is in the position corresponding to the normal or null position of the elevator 202. When the system is adjusted in this manner the pilot, when he operates the control column from its null position, feels the centralising force exerted by the centralising device on the control column 201 and this centralising force then corresponds in magnitude and sense to the deflection imparted to the elevator 202 from this null position; consequently the human pilot experiences "artificial feel" corresponding to the torque that he would feel if he had adjusted the elevator 202 directly by the control column 201 and was thus experiencing the back thrust from the control surface.

If the aircraft is out of trim the elevator 202, will, in general, have to be held deflected by an appropriate amount to compensate for the out-of-trim condition, that is to say, it will have to be given an appropriate average or long-term deflection in addition to whatever short-term fluctuation deflections are required to produce the required or demanded short-term displacements of the elevator 202. The human pilot will have to maintain this mean deflection of the elevator by maintaining a mean deflection of the control column 201 and he will therefore feel that the centralising spring device is exerting centralising forces on the control column 201 having as their mean value a steady component force in one direction. This provides him with the information that the aircraft is out of trim.

The object of providing the settable adjustment of the "artificial feel" device 216' is to enable the pilot to set the null position of the device to correspond to the means deflection of the elevator 202 required to compensate for the out of trim condition of the aircraft. To do this the pilot adjusts the "artificial feel" device 216', when he is controlling the aircraft under manual control, by displacing the anchorage of the centralising spring until he experiences no long-term component of centralising force exerted on the control column 201 by the centralising spring. The system is then said to be trimmed and the pilot feels only the fluctuating components of the centralising force exerted by the "artificial-feel" device, corresponding to the displacements of the elevator about its trim position. The adjustment of the "artificial feel" device 216' to its trim position is effected by the trim motor 216" which may be energised by the pilot at will by the operation of one or other of the switches U and V on the pilot's panel P.

With the present control system, there are alternative modes of operation capable of being set into operation as desired, namely, a manual control mode in which the elevator 202 is controlled to follow movement of the control column 201 and an automatic control mode in which the elevator 202 is automatically moved under the control of a controlling instrument or instruments in the control unit 205 to satisfy requirements that are monitored by the controlling instrument or instruments. The manual control arrangements are provided with the "artificial feel" device described above with provision for adjusting the null position of the "artificial feel" device to compensate for out-of-trim conditions of the aircraft. During a period of automatic control the elevator may have been adjusted to compensate for an out-of-trim condition of the aircraft and in order to ensure that, if the system is changed over suddenly from automatic control to manual control, the "artificial feel" device 216, is correctly trimmed to suit the position of the control column 201 at the beginning of the subsequent manual control mode of operation, an arrangement is provided for automatically adjusting the setting of the "artificial feel" device 216' during the automatic mode of operation. If the instrument or instruments in the control unit 205 are controlling the aircraft about its pitch axis to fly horizontally or at a certain angle of climb the "artificial feel" device 216' is automatically slowly adjusted during the automatic control of the aircraft so that when the changeover to manual control takes place, no centralising force is exerted on the control column 201, during subsequent control of the aircraft, if the control column 201, is held in the position required to make the aircraft continue in the mode of flight previously maintained under automatic control whether this mode is level flight or a climb at a constant angle.

In order to achieve this result the output of the electrical differential 268 which is the difference between the signal generated by the potentiometer 206 and the signal generated by the potentiometer 207 is applied to the amplifier 269 and the amplifier output is applied by way of the leads 290 to control the trim motor 216″ to rotate slowly in one direction or the other depending on the sense of the signal derived from the amplifier 269. The control column 201 when left alone by the human pilot during the automatic mode of operation of the control system is centralised by the spring centralising device of the "artificial feel" device 216′ and therefore moves with the latter when the latter is moved by the trim motor 216″. The mechanical differential device 204 permits differential movement to occur between the control column 201 and the elevator 202 during automatic mode of operation and, accordingly, when the elevator 202 is displaced during automatic control a difference signal will exist in the electrical differential 268 which will cause the trim motor 216″ to run in the direction to reduce the force that the centralising device exerts on the control column 201. As a result the member or movable part 216b of the feel device is caused to assume a position that corresponds to the mean position of the control surface.

The centralising force exerted by the centralising spring on the control column 201 is sufficient to overcome any frictional force opposing displacement of the control column.

The output of the electrical differential 268 is rendered effective through the amplifier 269 to energize the trim motor 216″ by the closing of contacts B4 when the relay B is energised on depressing switch N on the pilot's panel P to introduce automatic control of the aircraft. At the same time, as a result of the closure of switch N, the switch 213′ is actuated to disconnect the potentiometer 206 from the control circuits.

During the automatic control mode of operation of the system short-term correction movements are continually applied to the elevator 202 to correct disturbances of the aircraft. These movements of the elevator are superimposed on the mean value of the deflection of the elevator required to compensate for any out-of-trim condition of the aircraft. The short-term oscillating displacements of the elevator do not appreciably affect the operation of the automatic control arrangements for the trim adjustment. They produce short-term oscillations in the misalignment between the control column 201 and the elevator 202 and consequent short-term oscillations in the error signal developed in the electrical differential 268 and applied to the trim motor 216″. However, as the trim motor 216″ responds only slowly to the error signal these short-term oscillations average out to zero over a period long compared with the period of the short-term oscillatory disturbance of the aircraft and the trim motor will drive the "artificial feel" device to seek a position substantially corresponding to the mean position of the elevator 202, with only a very small oscillating disturbance superimposed.

As a result of the operation of the automatic trim system the control system as a whole is always kept substantially trimmed so that if a changeover from the automatic mode of operation to the manual mode of operation takes place the "artificial feel" device is correctly trimmed at the beginning of the manual control period so that, even if the pilot does not immediately take control of the control column, the centralising device tends to move the control column 201 towards the mean of the positions through or in which it was previously being moved or held during the automatic control mode of operation. The elevator 202 will therefore be given a deflection corresponding to the mean of the deflections that were previously being imparted to it under automatic control.

The magnitude of the centralising force applied by the "artificial feel" device to the control column 201 corresponding to any particular deflection of the control column, that is to say, the force displacement ratio of the "artificial feel" device is also made variable so that it may be increased or decreased when the aero dynamic force applied to the elevator 202 for a given deflection of the elevator, that is to say, the force displacement ratio of the elevator is increased or decreased, for example, when the air speed of the aircraft is increased or decreased. In other words, the effective stiffness of the centralising spring device is made adjustable so that it can be increased or decreased as the effective stiffness of the aero dynamic returning force acting on the elevator increases or decreases. The adjustment of the effective stiffness of the centralising spring is effected automatically in dependence on the variable factor by a feel adjustment motor 293. The motor 293 may be controlled to adjust the lever arm with which the spring exerts its centralising force on the control column 201 by angularly adjusting the position of the movable support part 257′ of the feel device about the pivot point 257″. The motor is controlled in dependence on a measure of air speed and the spring stiffness may be caused to vary in the same manner with air speed as does the aero dynamic stiffness which means that it should be varied according to the quantity $Pv^2$ where P denotes the air density and $v$ the air speed. An output signal dependent on this quantity is provided by an air speed indicator 291 which provides its output along the lead 292 to the feel adjustment motor 293.

It will be appreciated, of course, that manually-operated means may be provided for enabling the effective stiffness of the centralising spring device to be set in accordance with a desired variable factor, such as the air speed of the aircraft, variation of which varies the aero dynamic force that acts on the elevator when it is deflected.

Alternatively the centralising spring device may be a spring radially directed from the pivot axis of the control column 201. This provides a centralising force on the control column when the latter is deflected from the central position proportional at least for small deflections to the tension in the spring and to the angular deflection of the control column. A simple way of adjusting the effective stiffness of the spring is then to use the feel adjustment motor to extend or diminish the extension of the spring and in this way to increase or diminish the tension.

If desired the lost motion device 252 may be omitted from the control system and a modification of that part of the system of Figure 1 in which the lost motion linkage has been omitted is illustrated in Figure 2. In this case the frictional load of the linkage system has to be overcome by the human pilot. In this embodiment also an additional signal generator, 300, is provided which provides a signal that is substantially proportional to the displacement of the member 216b from a null position with respect to its support. This signal may be supplied to the electrical differential 268 instead of the signal from the potentiometer 206 during the automatic mode of operation to produce the difference signal that is used to energise the motor 216″ to cause the member 216b to assume a position corresponding to the mean position of the control surfaces.

If desired the contact 213′ may be left closed in the position shown in Figure 1a during the automatic mode of operation so that if the difference signal in the differential device 268, which signal is actually a measure of the displacement of the elevator 202 from its mean position, exceeds a predetermined amount the relay E will operate to cut out the automatic control.

Accordingly excessive application of elevator from its null position during automatic control will cut out the automatic control system. However, in such a case it must be ensured that the relative displacement that can take place between the control surface and the manual controller during normal operation of the automatic pilot is smaller than the extent of the lost motion in the mechanical connection in between the output member of the servo-motor and the manual controller.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. In a combined automatic pilot and manual booster control system for dirigible craft with steering control means, the combination of, a manually operable member; and artificial feel device having centralizing means, a first movable part operatively connected to said member, a second movable part operatively connected to said first movable part, and motive means operatively connected to said second part; means actuated by said member providing an output in accordance with departure of the member from a null condition, a servo motor operatively connected to the steering control means, means providing an output in accordance with departure of the steering control means from a null condition, a differential receiver for the outputs of said member output means and said steering output means providing an output, automatic pilot means proivding an output in accordance with short period disturbances of the craft about the axis that the steering means is effective, a transducer controlling the operation of said servo motor in accordance with the outputs of said differential receiver and said automatic pilot means, and a second differential receiver for the outputs of said member output means and said steering output means providing an output for operating the motive means of said artificial feel device to position the second movable part thereof with relation to the craft.

2. A system of the character claimed in claim 1 in which the centralizing means of said artificial feel device is provided by two springs interconnecting said first and second movable parts and said device includes a third movable part, second motive means for operating said third movable part to effectively vary the spring stiffness of the feel device, and means for operating said second motive means in accordance with the air speed of the craft.

3. In a manual booster control system for dirigible craft with steering control means, the combination of, a manually operable member; an artificial feel device having centralizing means, a first movable part operatively connected to said member, a second movable part operatively connected to said movable part, and motive means operatively connected to said second part; means actuated by said member providing an output in accordance with departure of the member from a null condition, a servo motor operatively connected to the steering control means, means providing an output in accordance with departure of the steering control means from a null condition, a differential receiver for the outputs of said member output means and said steering output means providing an output, a transducer controlling the operation of said servo motor in accordance with the output of said differential receiver, and a second differential receiver for the outputs of said member output means and said steering output means providing an output for operating the motive means of said artificial feel device to position the second movable part thereof with relation to the craft.

4. A system of the character claimed in claim 3 in which the centralizing means of said artificial feel device is provided by two springs interconnecting said first and second movable parts and said device includes a third movable part, second motive means for operating said third movable part to effectively vary the spring stiffness of the feel device, and means for operating said second motive means in accordance with the air speed of the craft.

5. In an automatic pilot control system for dirigible craft with steering control means, the combination of, a manually operable member; an artificial feel device having centralizing means, a first movable part operatively connected to said member, a second movable part operatively connected to said first movable part, and motive means operatively connected to said second part; means actuated by said member providing an output in accordance with departure of the member from a null condition, a servo motor operatively connected to the steering control means, means providing an output in accordance with departure of the steering control means from a null condition, automatic pilot means providing an output in accordance with long period disturbances of the craft about the axis that the steering means is effective, a differential receiver for the outputs of said automatic pilot means and said steering output means providing an output, a transducer controlling the operation of said servo motor in accordance with the output of said differential receiver, and a second differential receiver for the outputs of said member output means and said steering output means providing an output for operating the motive means of said artificial feel device to position the second movable part thereof with relation to the craft.

6. A system of the character claimed in claim 5, including automatic pilot means providing an output in accordance with short period disturbances of the craft about the axis that the steering means is effective, and means for combining said short period automatic pilot means with said long period automatic pilot means to provide a second input to said transducer.

7. A system of the character claimed in claim 5, in which the centralizing means of said artificial feel device is provided by two springs interconnecting said first and second movable parts and said device includes a third movable part, second motive means for operating said third movable part to effectively vary the spring stiffness of the feel device, and means for operating said second motive means in accordance with the air speed of the craft.

8. In a combined automatic pilot and manual booster system for dirigible craft with steering control means, the combination of, a manually operable member, an artificial feel device including centralizing springs, a first movable part operatively connected to said member, a second movable part, operatively connected to said first part, a third movable part for varying the effective spring stiffness of said feel device, means for positioning said third movable part in accordance with the air speed of the craft, and a differential with an output for positioning said second movable part whose inputs are derived from said member and the steering control means.

References Cited in the file of this patent

UNITED STATES PATENTS

| | | |
|---|---|---|
| 2,451,263 | Webb | Oct. 12, 1948 |
| 2,471,821 | Kutzler et al. | May 31, 1949 |
| 2,475,484 | De Nise | July 5, 1949 |
| 2,739,771 | Meredith | Mar. 27, 1956 |